(12) United States Patent
Fournet et al.

(10) Patent No.: US 10,850,980 B2
(45) Date of Patent: Dec. 1, 2020

(54) SYSTEM AND PROCESS FOR GENERATING HYDROGEN GAS

(71) Applicant: ARIANEGROUP SAS, Paris (FR)

(72) Inventors: Arnaud Fournet, Kourou (FR); Jean-Jacques Fournier, Ballancourt-sur-Essonne (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 16/072,408

(22) PCT Filed: Jan. 24, 2017

(86) PCT No.: PCT/FR2017/050145
§ 371 (c)(1),
(2) Date: Jul. 24, 2018

(87) PCT Pub. No.: WO2017/129889
PCT Pub. Date: Aug. 3, 2017

(65) Prior Publication Data
US 2018/0362340 A1 Dec. 20, 2018

(30) Foreign Application Priority Data
Jan. 26, 2016 (FR) ...................................... 16 50584

(51) Int. Cl.
*C01B 3/04* (2006.01)
*B01J 7/00* (2006.01)

(52) U.S. Cl.
CPC ...... *C01B 3/04* (2013.01); *B01J 7/00* (2013.01); *Y02E 60/364* (2013.01)

(58) Field of Classification Search
CPC ....................................................... C01B 3/04
See application file for complete search history.

(56) References Cited

U.S. PATENT DOCUMENTS

2011/0033342 A1   2/2011   Horiguchi et al.
2011/0207027 A1*  8/2011   Kim .......................... C01B 3/00
                                                    429/515

FOREIGN PATENT DOCUMENTS

FR    2 011 354 A1    2/1970
FR    2 957 911 A1    9/2011
(Continued)

OTHER PUBLICATIONS

International Search Report as issued in International Patent Application No. PCT/FR2017/050145, dated Apr. 26, 2017.

*Primary Examiner* — Douglas B Call
(74) *Attorney, Agent, or Firm* — Pillsbury Winthrop Shaw Pittman LLP

(57) ABSTRACT

A system for producing gaseous hydrogen, includes an enclosure formed by a side wall, a front end wall, and a rear end wall, the enclosure containing unit charge(s) of a material for generating gaseous hydrogen when heated, wherein each unit charge includes a cylindrical body including a closed rear end wall and a front end wall having an opening, at least one block of material for generating gaseous hydrogen, each block presenting an annular shape defining a central channel leading to the opening in the front end wall of the body and an initiator present in the vicinity of the rear end wall of the body; the opening facing the front end wall of the enclosure so that the hot gas coming from the block of material for generating gaseous hydrogen when heated is directed directly against the inside surface of the front end wall of the enclosure.

11 Claims, 6 Drawing Sheets

(56) References Cited

FOREIGN PATENT DOCUMENTS

GB         2 164 637 A     3/1986
GB         2 470 267 A     11/2010

\* cited by examiner

SYSTEM AND PROCESS FOR GENERATING HYDROGEN GAS

CROSS-REFERENCE TO RELATED APPLICATIONS

This application is the U.S. National Stage of PCT/FR2017/050145, filed Jan. 24, 2017, which in turn claims priority to French patent application number 1650584 filed Jan. 26, 2016. The content of these applications are incorporated herein by reference in their entireties.

BACKGROUND OF THE INVENTION

The invention relates to a system for producing gaseous hydrogen. More precisely, the invention relates to a gaseous hydrogen generation system of the "multi-pulse accumulation" type, i.e. a system suitable for generating gaseous hydrogen from a plurality of unit charges that are initiated in succession as a function of the quantity of gaseous hydrogen that is needed, the gaseous hydrogen that is produced being stored in the system and being delivered on demand to one or more pieces of equipment that are connected to the system, such as a fuel cell, for example.

Documents US 2011/0033342 and FR 2 957 911 describe gaseous hydrogen production systems that comprise a plurality of cartridges each containing a material suitable for generating gaseous hydrogen and suitable for being initiated on command so as to be able to control the quantity of gaseous hydrogen that is produced.

Nevertheless, in the systems disclosed in those documents, the thermal decomposition of the material that is suitable for generating gaseous hydrogen is not always optimized, in particular in terms of the rate at which gaseous hydrogen is produced by each cartridge.

There thus exists a need for a gaseous hydrogen production system that provides better control over production rate.

OBJECT AND SUMMARY OF THE INVENTION

To this end, the present invention proposes a system for producing gaseous hydrogen, the system comprising an enclosure formed by a side wall, a front end wall, and a rear end wall, said enclosure containing one or more unit charges of at least one material suitable for generating gaseous hydrogen when heated, the system being characterized in that each unit charge comprises a cylindrical body including a closed rear end wall and a front end wall having an opening, at least one block of material suitable for generating gaseous hydrogen when heated being present inside the cylindrical body, each block presenting an annular shape defining a central channel leading to the opening in the front end wall of the cylindrical body and at least one initiator present in the vicinity of the rear end wall of the cylindrical body.

The hydrogen production system of the invention is advantageous in particular in that it enables good thermal decomposition to be obtained of the gaseous hydrogen generator material in each unit charge. Because of the presence of a central channel through the block(s) of hydrogen generator material within each unit charge, and by having an initiator in the vicinity of the rear end wall of the cylindrical body, it is possible by means of the hot gas flowing to initiate and then to sustain radial thermal decomposition of the block(s) of hydrogen generator material so as to make it possible to ensure complete and accelerated thermal decomposition of the material present in the unit charge. This serves to improve the rate at which gaseous hydrogen is produced by each unit charge in the hydrogen generation production by obtaining a flow rate that is higher and more regular throughout the thermal decomposition of the hydrogen generator material in each unit charge.

In an embodiment of the gaseous hydrogen production system of the invention, each unit charge has a plurality of segments of a material suitable for generating gaseous hydrogen when heated, each segment being annular in shape with a central opening, the segments being stacked on one another in the cylindrical body in such a manner as to define between them a central channel for discharging the gaseous hydrogen.

According to a particular characteristic of the gaseous hydrogen production system of the invention, the opening in the front end wall of the cylindrical body of each unit charge leads into a collector volume of the enclosure that is suitable for exchanging heat with the front end wall of the enclosure. This makes it possible to dissipate a significant portion of the heat conveyed by the hot gas leaving a unit charge.

According to another particular characteristic of the gaseous hydrogen production system of the invention, it includes an accumulation capacity for accumulating gaseous hydrogen that is present beside the rear end wall of the enclosure, and a gas flow circuit extends between the collector volume and the accumulation capacity, the flow circuit being suitable for exchanging heat with the side wall of the enclosure. This also contributes to dissipating the heat conveyed by the hot gas.

According to yet another particular characteristic of the gaseous hydrogen production system of the invention, it includes a plurality of unit charges, the unit charges being held spaced apart from one another in the enclosure by a holder block of thermally insulating material. Holding the block in this way serves to reduce any risk of undesired initiation of one or more unit charges adjacent to a charge that has been initiated voluntarily, while also optimizing the packing factor of the unit charges in the system.

The invention also provides a method of generating gaseous hydrogen in a gaseous hydrogen production system comprising an enclosure formed by a side wall, a front end wall, and a rear end wall, said enclosure containing one or more unit charges of at least one material suitable for generating gaseous hydrogen when heated, the method comprising initiating each unit charge in succession and being characterized in that each unit charge comprises a cylindrical body including a closed rear end wall and a front end wall having an opening, at least one block of material suitable for generating gaseous hydrogen when heated being present inside the cylindrical body, each block presenting an annular shape defining a central channel leading to the opening in the front end wall of the cylindrical body and at least one initiator present in the vicinity of the rear end wall of the cylindrical body.

In an implementation of the gaseous hydrogen generation method of the invention, each charge has a plurality of segments of a material suitable for generating gaseous hydrogen when heated, each segment being annular in shape with a central opening, the segments being stacked on one another in the cylindrical body in such a manner as to define between them a central channel for discharging the gaseous hydrogen.

According to a particular characteristic of the gaseous hydrogen generation method of the invention, the opening in the front end wall of the cylindrical body of each unit charge leads into a collector volume of the enclosure that is suitable for exchanging heat with the front end wall of the enclosure.

This makes it possible to dissipate a significant portion of the heat conveyed by the hot gas leaving a unit charge.

According to another particular characteristic of the gaseous hydrogen generation method of the invention, an accumulation capacity for accumulating gaseous hydrogen is present beside the rear end wall of the enclosure, and the gaseous hydrogen produced in the collector volume by the unit charges is conveyed into the accumulation capacity while exchanging heat with the side wall of the enclosure. This also contributes to dissipating the heat conveyed by the hot gas.

According to yet another particular characteristic of the gaseous hydrogen generation method of the invention, the gaseous hydrogen production system has a plurality of unit charges, the unit charges being held spaced apart from one another inside the enclosure by a holder block made of thermally insulating material, the charges extending axially in the enclosure between the front end wall and the rear end wall of the enclosure, at least one unit charge situated in the proximity of the side wall being initiated first prior to initiating other unit charges. This serves to reduce any risk of undesired initiation of one or more unit charges adjacent to another charge that has been initiated voluntarily. These risks can be further limited by ensuring that any unit charge that is subsequently initiated is adjacent to said at least one unit charge that has already been initiated.

BRIEF DESCRIPTION OF THE DRAWINGS

The invention can be better understood in the light of the following description made by way of non-limiting indication and with reference to the accompanying drawings, in which.

DETAILED DESCRIPTION OF EMBODIMENTS

Figure 1:
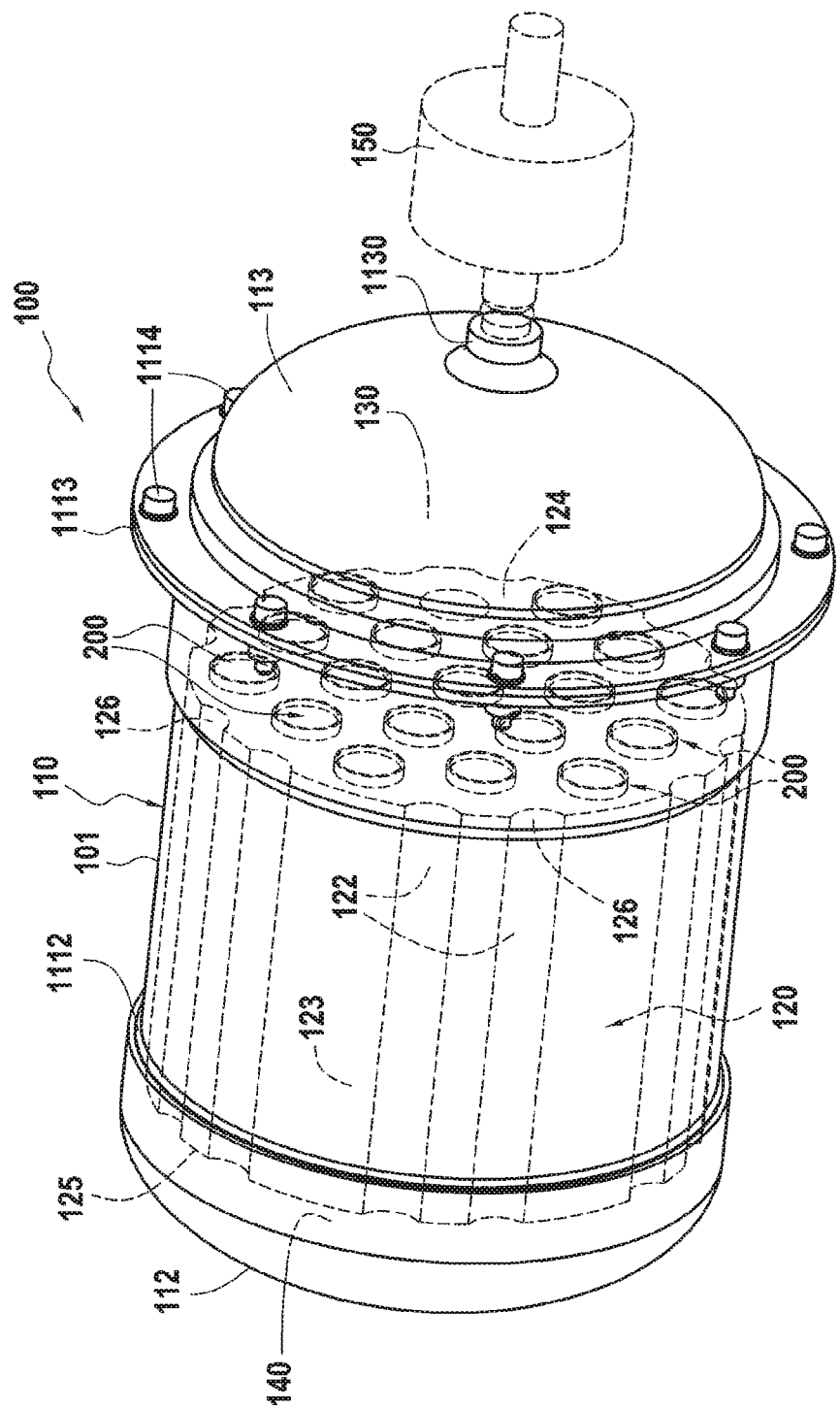
FIG. 1 is a diagrammatic perspective view of a gaseous hydrogen generator system in accordance with an embodiment of the invention.
Figure 2:
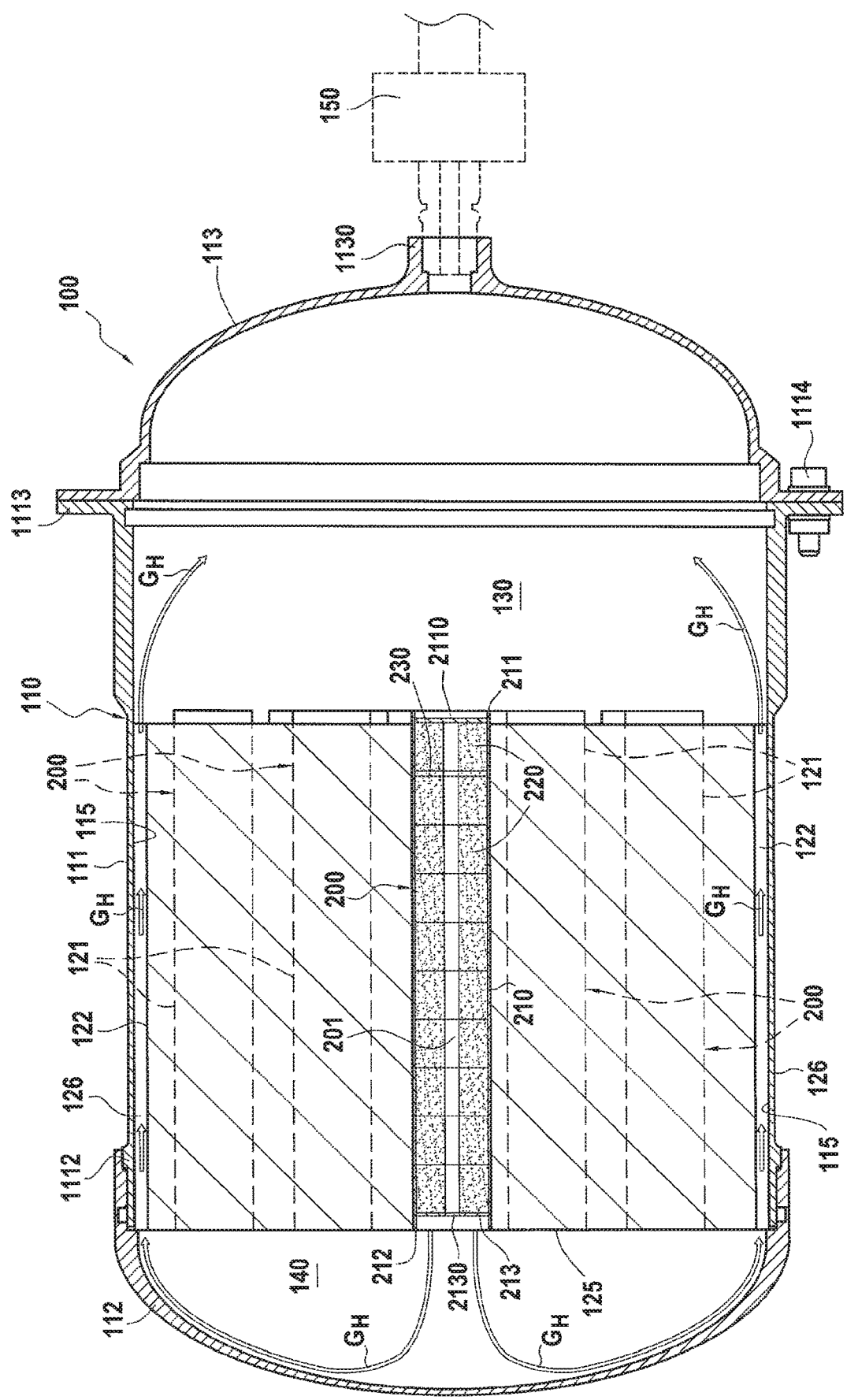
FIG. 2 is an axial section view of the FIG. 1 system.
Figure 3:
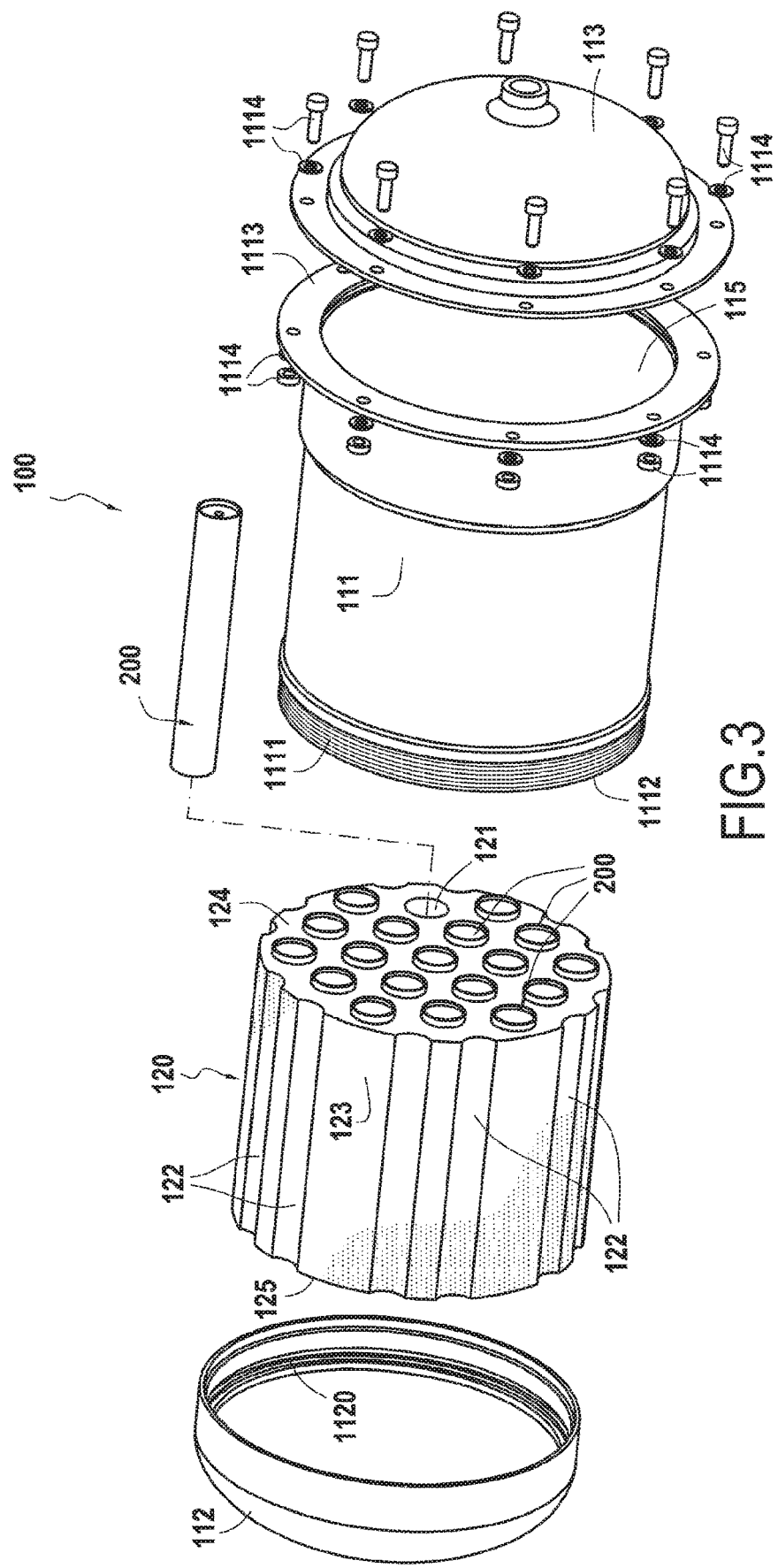
FIG. 3 is an exploded view of the FIG. 1 system.

FIGS. 1 to 3 show a gaseous hydrogen production system 100 comprising an enclosure 110 formed by a side wall 111, which is of cylindrical shape in this example, by a front end wall 112, and by a rear end wall 113, both of which are bell-shaped in this example. The front end wall 112 is fastened to the side wall by means of a screw thread 1120 co-operating with a threaded portion 1111 present on a front end 1112 of the side wall 111 (FIG. 2). The rear end wall 113 is fastened on the rear end 1113 of the wall 111 by means of nut-and-bolt type fastener means 1114.

The enclosure 110 contains a plurality of unit charges 200, each containing a charge of at least one material suitable for generating gaseous hydrogen when heated, such as for example a material based on ammonia borane $NH_3BH_3$. The unit charges 200 are arranged axially in the enclosure 110, inside the side wall 111. The unit charges 200 are held in housings 121 present in a holder block 120 made of a thermally insulated material. In this example, the block 120 is in the form of a cylinder with a diameter corresponding to the inside diameter of the side wall 111.

The volume 130 defined between the rear end wall 113 and the rear end 124 of the holder block 120 constitutes the capacity of the system 100 for accumulating gaseous hydrogen produced by the unit charges 200, the gaseous hydrogen stored in the volume 130 being discharged from the enclosure 110 via an outlet duct 1130 present on the rear end wall 113. The flow rate of the gaseous hydrogen discharged from the enclosure 110 is adjusted by a flow rate regulator 150 connected to one or more pieces of equipment (not shown) that need to be fed with hydrogen, such as a fuel cell, for example.

The volume 140 defined between the front end wall 112 and the front end 125 of the holder block 120 constitutes a volume for collecting the gaseous hydrogen produced by each unit charge 200. The gaseous hydrogen as collected in this way in the volume 140 is taken to the volume 130 constituting the gaseous hydrogen accumulation capacity by a hydrogen flow circuit that extends between these two volumes and that comprises peripheral channels 126 formed by fluting 122 formed in the outside surface 123 of the holder block 120, the fluting 122 facing the inside surface 115 of the side wall 111. The path followed by the hot gaseous hydrogen gas on leaving a unit charge 200 and leading into the volume 140 is represented by arrows $G_H$ in FIG. 2.

Figure 5:
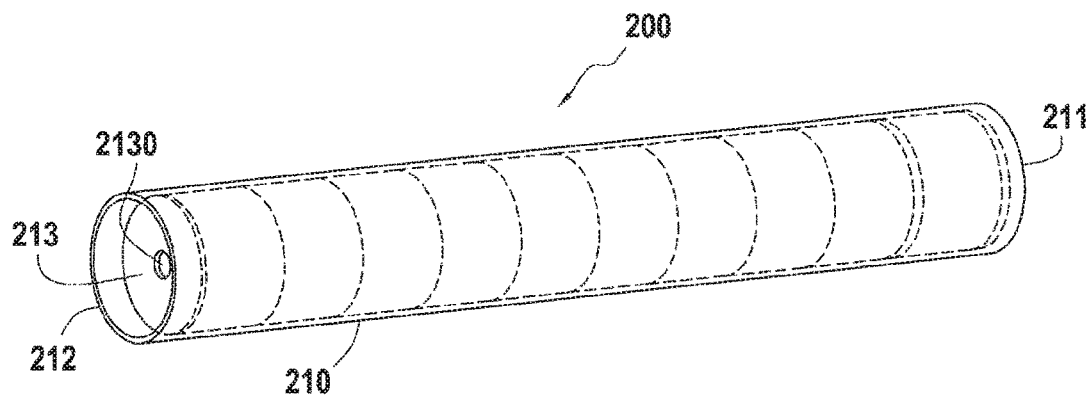
FIGS. 5 to 7 are diagrams respectively in perspective, in section, and in exploded view of a unit charge of the FIG. 1 system.
Figure 6:
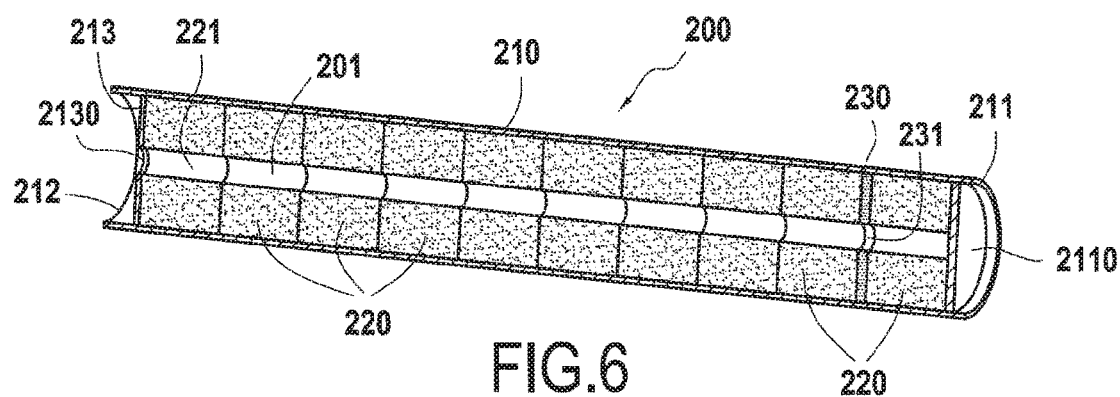
Figure 7:
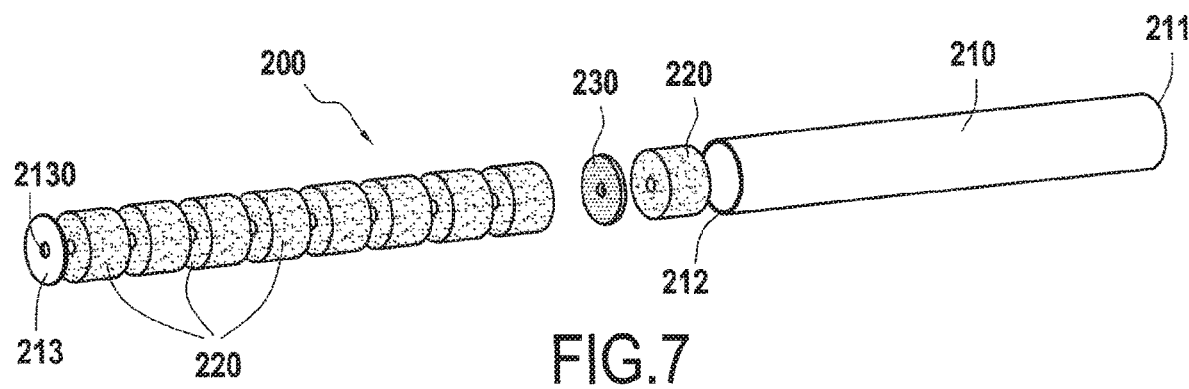

As shown in FIGS. 5 to 7, each unit charge 200 comprises a cylindrical body 210, e.g. made of a thermostable plastics material, comprising a rear end wall 211 closed by a cover 2110 and a front end wall 212 having an opening 2130. In the presently-described example, the front end wall 212 comprises a thermal protection disk 213 with its opening 2130 constituting the front end wall opening of the cylindrical body 210. The unit charge 200 contains a plurality of annular segments 220 of a material that is suitable for generating gaseous hydrogen when heated. Each annular segment 220 has a central opening 221. The annular segments 230 are stacked on one another inside the cylindrical body 210 and together their central openings 221 define a central channel 201 suitable for discharging the gaseous hydrogen produced by the segments 220.

Each unit charge 200 also has an initiator 230 connected to a control system (not shown) enabling the segments 220 adjacent to said initiator to be ignited. The initiator 230 is preferably placed close to the closed rear end wall 211 of the cylindrical body 210 so as to begin by initiating thermal decomposition of the segments 220 that are closest to the closed end wall of the cylindrical body and subsequently to initiate thermal decomposition of the other segments by progressively approaching the front end wall 212 of the cylindrical body 210. In the presently-described example, the initiator 230 is in the form of a disk having a central opening 231 suitable for co-operating with the central opening 221 of the segments 220. In this example, the initiator 230 is placed between the two segments 220 that are closest to the rear end wall 211 of the cylindrical body 210.

Each unit charge could equally well contain a single monolithic block of material suitable for generating gaseous hydrogen when heated, the monolithic block presenting a shape and dimensions matching the shape and dimensions of the set of segments 220 as described above. Under such circumstances, the annular initiator is initially placed between the rear end wall of the cylindrical body of the unit charge prior to inserting the monolithic block of gaseous hydrogen generating material into the cylindrical body.

In the system of the invention for producing gaseous hydrogen, the quantity of heat conveyed by the hot gas produced by each unit charge is rapidly dissipated to the outside of the enclosure 110. Specifically, the opening 2130 in the front end wall 212 of each unit charge 200 is placed facing the front end wall 112 so that the hot gas $G_H$ obtained by thermal decomposition of the segments 220 inside the cylindrical body 210 is projected directly against the inside surface of the front end wall 112 and flows along it prior to penetrating into the peripheral channels 122. Thus, the hot gas $G_H$ exchanges heat with the front end wall 112 immediately on entering the volume 140 and it is cooled by external convection (FIG. 2).

In addition, the flow of hot gas $G_H$ in the peripheral channels 122 towards the volume 130 constituting the gaseous hydrogen accumulation capacity also contributes to dissipating the heat conveyed by this gas. Specifically, since the peripheral channels are formed by spaces that are present beside the side wall 111 and the flutes 121 in the holder block 120, the hot gas $G_H$ exchanges heat with the side wall 111 by convection with the outside.

Figure 4:
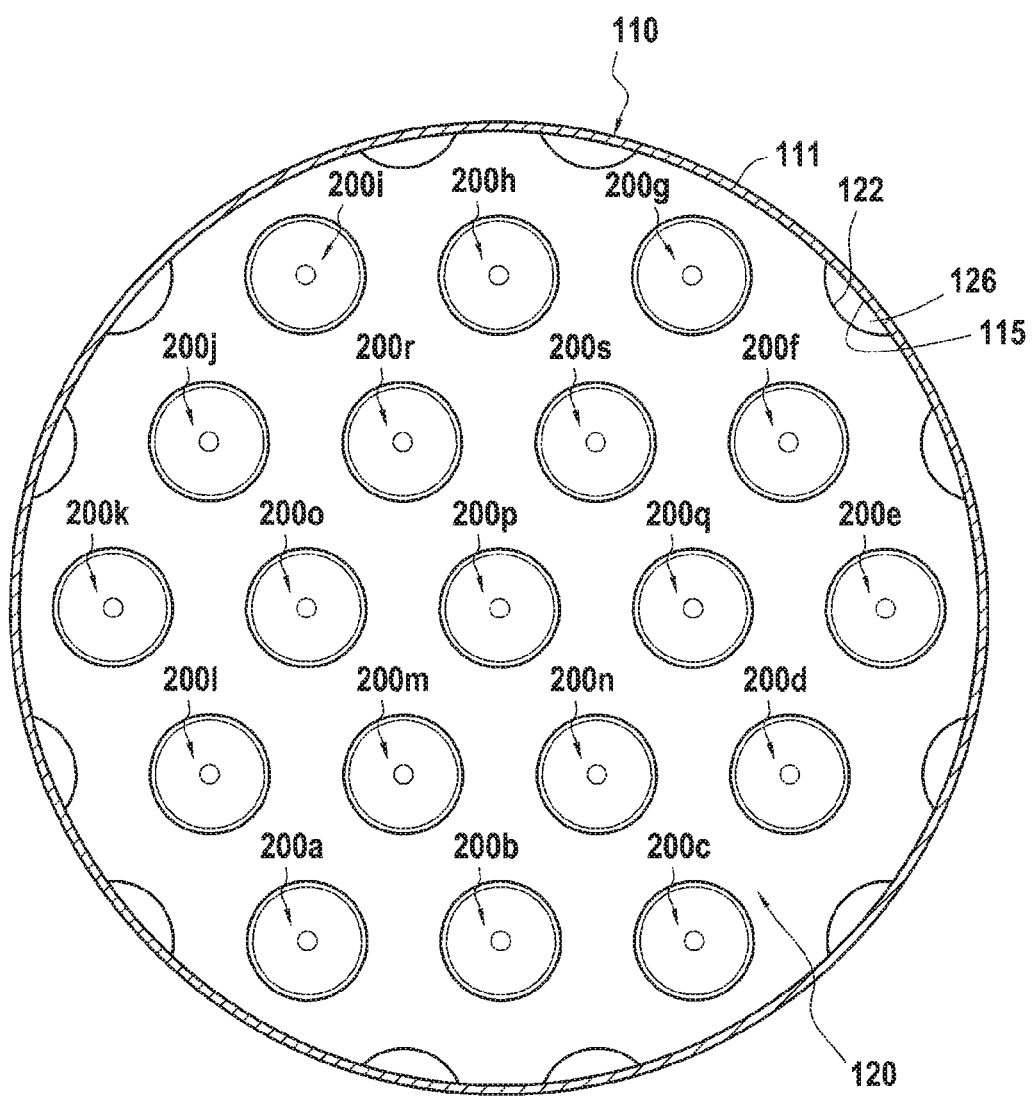
FIG. 4 is a face view of unit charges in the FIG. 1 system.

As shown in FIG. 4, the unit charges 200 are distributed and held spaced apart from one another inside the enclosure 110 by the holder block 120. The unit charges 200 extend axially in the enclosure 110 inside the side wall 110, i.e. between the front end wall 112 and the rear end wall 113 of the enclosure 110 (FIGS. 1 and 2).

A control system (not shown) is connected to each initiator of the unit charges so as to cause them to be ignited sequentially. When the system 100 is required to produce gaseous hydrogen, the control system preferably begins by initiating one of the unit charges situated close to the side wall 111, i.e. one of the unit charges 200a to 200l shown in FIG. 4. This makes it possible to limit the number of adjacent unit charges with which the initiated unit charge might exchange heat, thereby reducing any risk of undesired initiation of a charge. Thereafter, the control system preferably initiates the unit charge(s) adjacent to the already-initiated unit charge. For example, if the unit charge 200c is the first charge to be initiated by the control system, the control system then initiates the adjacent charges, namely the unit charges 200b, 200n, and 200d. By acting in this way to initiate the unit charges that are adjacent to a charge that has already been initiated, a limit is put on the number of not-yet initiated unit charges that are adjacent to charges with which heat might be exchanged.

Figure 8:
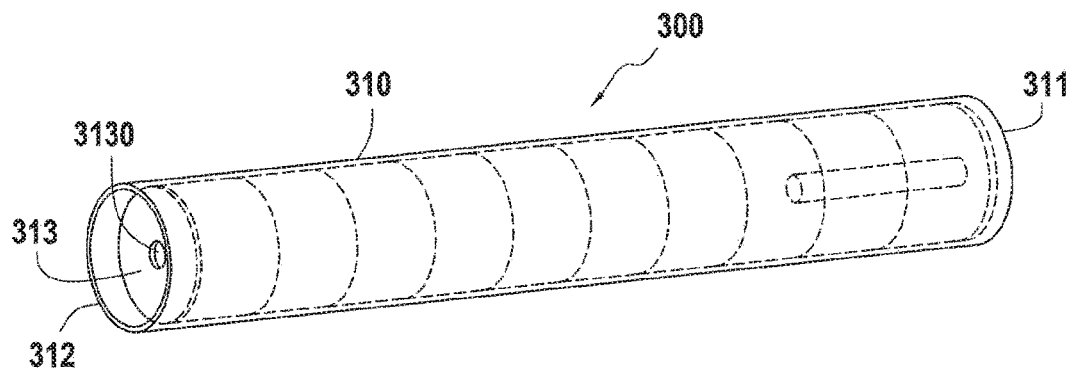
FIGS. 8 to 10 are diagrams respectively in perspective, in section, and in exploded view of a unit charge in accordance with another embodiment of the invention.
Figure 9:
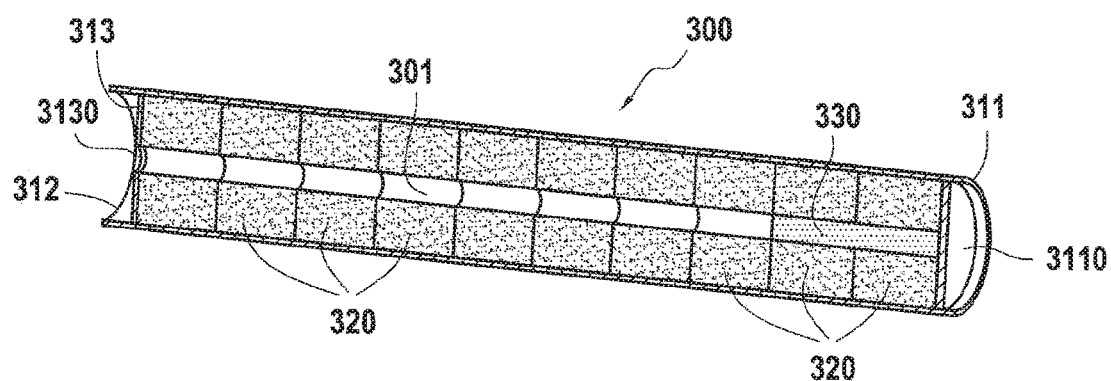
Figure 10:
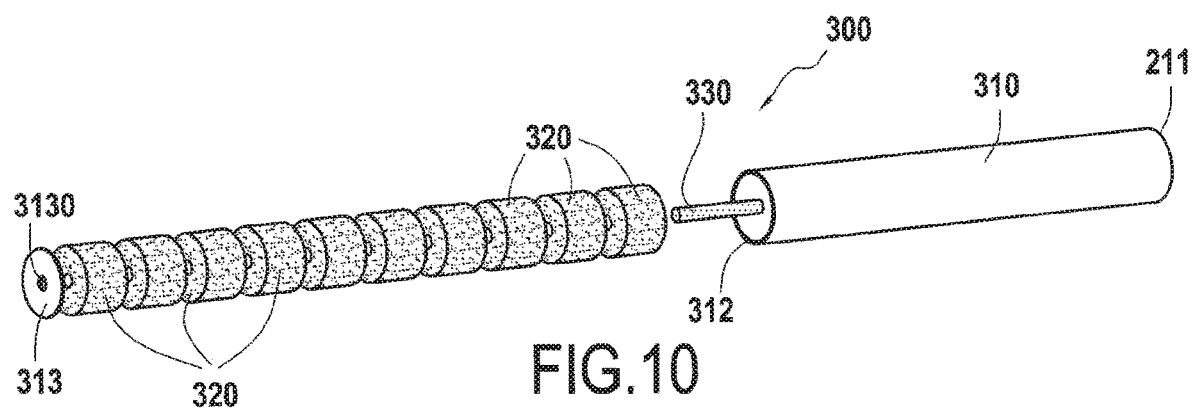

FIGS. 8 to 10 show a unit charge 300 in another embodiment of the invention. In like manner to the above-described charge 200, the unit charge 300 comprises a cylindrical body 310 having a rear end wall 311 closed by a cover 3110 and a front end wall 312 including an opening 3130 that is present, in this example, in a thermal protection disk 313. The unit charge 300 contains a plurality of annular segments 320 of material suitable for generating gaseous hydrogen when heated. Each annular segment 320 has a central opening 321. The annular segments 320 are stacked on one another inside the cylindrical body 310 and together their central openings 321 define a central channel 301 suitable for discharging the gaseous hydrogen produced by the segments 320.

The unit charge 300 also has an initiator 330 connected to a control system (not shown) for igniting the segments 320 adjacent to said initiator. The initiator 330 is preferably placed close to the closed rear end wall 311 of the cylindrical body 310 so as to begin by initiating thermal decomposition of the segments 320 that are closest to the closed end wall of the cylindrical body with thermal decomposition of the other segments then being initiated coming progressively closer to the front end wall 212 of the cylindrical body 210.

In the presently-described example, the initiator 330 presents a cylindrical shape of dimensions adapted to be received in the central openings 321 of the segments 320. In this example, the initiator 330 is located in the central openings 321 of the two segments 320 that are closest to the rear end wall 311 of the cylindrical body 310.

The invention claimed is:

1. A system for producing gaseous hydrogen, the system comprising an enclosure formed by a side wall, a front end wall, and a rear end wall, said enclosure containing one or more unit charges of at least one material suitable for generating gaseous hydrogen when heated, wherein each unit charge comprises a cylindrical body including a closed rear end wall and a front end wall having an opening, at least one block of material suitable for generating gaseous hydrogen when heated being present inside the cylindrical body, each block presenting an annular shape defining a central channel leading to the opening in the front end wall of the cylindrical body and at least one initiator present in the vicinity of the rear end wall of the cylindrical body;

the opening in the front end wall of the cylindrical body facing the front end wall of the enclosure so that the hot gas coming from said at least one block of material suitable for generating gaseous hydrogen when heated is directed directly against the inside surface of the front end wall of the enclosure, wherein the system further comprises
a collector volume defined between the one or more unit charges and the front end wall of the enclosure to collect gaseous hydrogen generated by each of the one or more unit charges, the collector volume permitting heat exchange with the front end wall of the enclosure to dissipate heat conveyed by the hot gas leaving the one or more unit charges, and
one or more channels at an inner periphery of the enclosure to direct all gaseous hydrogen generated by each unit charge from the collector volume toward the rear end wall of the enclosure.

2. A system according to claim 1, wherein each unit charge has a plurality of segments of a material suitable for generating gaseous hydrogen when heated, each segment being annular in shape with a central opening, the segments being stacked on one another in the cylindrical body in such a manner as to define between them a central channel for discharging the gaseous hydrogen.

3. A system according to claim 1, wherein the opening in the front end wall of the cylindrical body of each unit charge leads into the collector volume of the enclosure.

4. A system according to claim 3, wherein the system includes an accumulation capacity for accumulating gaseous hydrogen that is present beside the rear end wall of the enclosure, and wherein a gas flow circuit extends between the collector volume and the accumulation capacity, the flow circuit being suitable for exchanging heat with the side wall of the enclosure.

5. A system according to claim 1, comprising a plurality of unit charges, the unit charges being held spaced apart from one another in the enclosure by a holder block of thermally insulating material.

6. A method of generating gaseous hydrogen in a gaseous hydrogen production system comprising an enclosure formed by a side wall, a front end wall, and a rear end wall, said enclosure containing one or more unit charges of at least one material suitable for generating gaseous hydrogen when heated, the method comprising initiating each unit charge in succession and wherein each unit charge comprises a cylindrical body including a closed rear end wall and a front end wall having an opening, at least one block of material suitable for generating gaseous hydrogen when heated being present inside the cylindrical body, each block presenting an annular shape defining a central channel leading to the opening in the front end wall of the cylindrical body and at least one initiator present in the vicinity of the rear end wall of the cylindrical body;

the opening in the front end wall of the cylindrical body facing the front end wall of the enclosure so that the hot gas coming from said at least one block of material suitable for generating gaseous hydrogen when heated is directed directly against the inside surface of the front end wall of the enclosure, wherein the gaseous hydrogen production system further comprises a collector volume defined between the one or more unit charges and the front end wall of the enclosure to collect gaseous hydrogen generated by each of the one or more unit charges, the collector volume permitting heat exchange with the front end wall of the enclosure to dissipate heat conveyed by the hot gas leaving the one or more unit charges, and one or more channels at an inner periphery of the enclosure to direct all gaseous hydrogen generated by each unit charge from the collector volume toward the rear end wall of the enclosure.

7. A method according to claim 6, wherein each charge has a plurality of segments of a material suitable for generating gaseous hydrogen when heated, each segment being annular in shape with a central opening, the segments being stacked on one another in the cylindrical body in such a manner as to define between them a central channel for discharging the gaseous hydrogen.

8. A method according to claim 6, wherein the opening in the front end wall of the cylindrical body of each unit charge leads into the collector volume of the enclosure.

9. A method according to claim 8, wherein an accumulation capacity for accumulating gaseous hydrogen is present beside the rear end wall of the enclosure, and wherein the gaseous hydrogen produced in the collector volume by the unit charges is converged into the accumulation capacity while exchanging heat with the side wall of the enclosure.

10. A method according to claim 6, wherein the gaseous hydrogen production system has a plurality of unit charges, the unit charges being held spaced apart from one another inside the enclosure by a holder block made of thermally insulating material, the unit charges extending axially in the enclosure between the front end wall and the rear end wall of the enclosure, and wherein at least one unit charge situated in the proximity of the side wall is initiated first prior to initiating other unit charges.

11. A method according to claim 10, wherein any unit charge that is subsequently initiated is adjacent to said at least one unit charge that has already been initiated.

* * * * *